United States Patent [19]

Tsuboi et al.

[11] 4,144,975
[45] Mar. 20, 1979

[54] TOOL TRANSFER APPARATUS

[75] Inventors: Akira Tsuboi; Tetsuro Yamakage, both of Kariya, Japan

[73] Assignee: Toyoda-Koki Kabushiki-Kaisha, Aichi, Japan

[21] Appl. No.: 869,784

[22] Filed: Jan. 16, 1978

[30] Foreign Application Priority Data

Jan. 19, 1977 [JP] Japan .................................. 52-5277

[51] Int. Cl.² ........................................ B23Q 3/157
[52] U.S. Cl. .................................. 414/736; 29/568; 414/749
[58] Field of Search ............ 214/1 CM, 1 BC, 1 BD, 214/147 T, 151; 29/568

[56] References Cited

U.S. PATENT DOCUMENTS

| 3,760,958 | 9/1973 | Lohneis | 214/1 BD |
| 3,786,938 | 1/1974 | Kirkham | 214/1 BD |

FOREIGN PATENT DOCUMENTS 47-43273 11/1972 Japan .................................. 214/1 BD Primary Examiner—Francis S. Husar
Assistant Examiner—George F. Abraham
Attorney, Agent, or Firm—Oblon, Fisher, Spivak, McClelland & Maier

[57] ABSTRACT

In a tool transfer apparatus, a pair of support shafts, which have tool transfer arms fixed thereto, are coaxially mounted for rotational and axial movement. A pair of driven gears are respectively formed on the support shafts. A pair of elongated drive gears are engaged with each other and engageable with the driven gears. One of the drive gears is driven by a single drive device. The driven gears are selectively shiftable together into a first predetermined position where the driven gears are rotatable in opposite directions through the drive gears and into a second predetermined position where the driven gears are rotatable in the same direction through one of the drive gears.

3 Claims, 5 Drawing Figures

TOOL TRANSFER APPARATUS

BACKGROUND OF THE INVENTION

1. Field of the Invention

The present invention relates to a tool transfer apparatus in an automatic tool changer for exchanging tools between a machine tool spindle and a tool change station.

2. Description of the Prior Art

In a known tool transfer apparatus wherein a pair of transfer arms are rotated in opposite directions to grasp or release tools and rotated 180 degrees in the same direction to perform a tool change operation, two independent drive devices are provided to individually rotate the tool transfer arms in opposite directions and in the same direction, which results in a complicated construction and control therefor.

Furthermore, in the known tool transfer apparatus, there is a fear that the tools grasped by the tool transfer arms may fall down during the shifting movement thereof due to a power failure of the drive devices for rotating the transfer arms.

Still furthermore, in the known tool transfer apparatus, the tool transfer arms remain positioned during a machining operation at a retracted position where the same grasp or release tools for a tool change operation. Accordingly, accessibility of the tool held in the machine tool spindle to a workpiece to be machined is somewhat limited and chips may adhere to the tool grips of the transfer arms.

SUMMARY OF THE INVENTION

It is therefore an object of the present invention to provide a new and improved tool transfer apparatus wherein a pair of tool transfer arms are rotated in opposite directions and in the same direction by a single drive source.

Another object of the present invention is to provide a new and improved tool transfer apparatus wherein a pair of transfer arms are mechanically restrained from rotation during their shifting movement, even in the event of a power failure of a drive device for rotating the transfer arms.

Still another object of the present invention is to provide a new and improved tool transfer apparatus of the character set forth herein wherein the transfer arms are maintained during a machining operation at a position more retracted than a position where the transfer arms grasp or release tools for a tool change operation.

Briefly, according to the present invention, these and other objects are achieved by providing a tool transfer apparatus in an automatic tool changer for exchanging tools between a machine tool spindle and a tool change station, as described below. First and second support shafts are coaxially mounted on a frame for rotational and axial movement thereon. First and second transfer arms are superposed with each other and respectively secured to the first and second support shafts. The transfer arms are formed at respective opposite ends with tool gripping portions for gripping the tools. First and second driven gears are formed on the first and second support shafts, respectively. First and second elongated drive gears are engaged with each other and engageable with the first and second driven gears. Means are provided for axially shifting the first and second driven gears between first and second predetermined positions. The first driven gear is engaged with the first drive gear and the second driven gear is engaged with the second drive gear, when positioned at the first predetermined position. The first and second driven gears are engaged with one of the first and second drive gears, when positioned at the second predetermined position. The first and second driven gears are engaged with both of the first and second drive gears during the shifting movement. A rack is engaged with one of the first and second drive gears. Drive means are connected to the rack for rotating the first and second driven gears at the first predetermined position in opposite directions to thereby simultaneously grip the tools by the gripping portions of the transfer arms and for rotating the first and second driven gears at the second predetermined position in the same direction to thereby replace the mutual position of the tools gripped by the transfer arms.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which.

DETAILED DESCRIPTION OF THE PREFERRED EMBODIMENT

Figure 1:
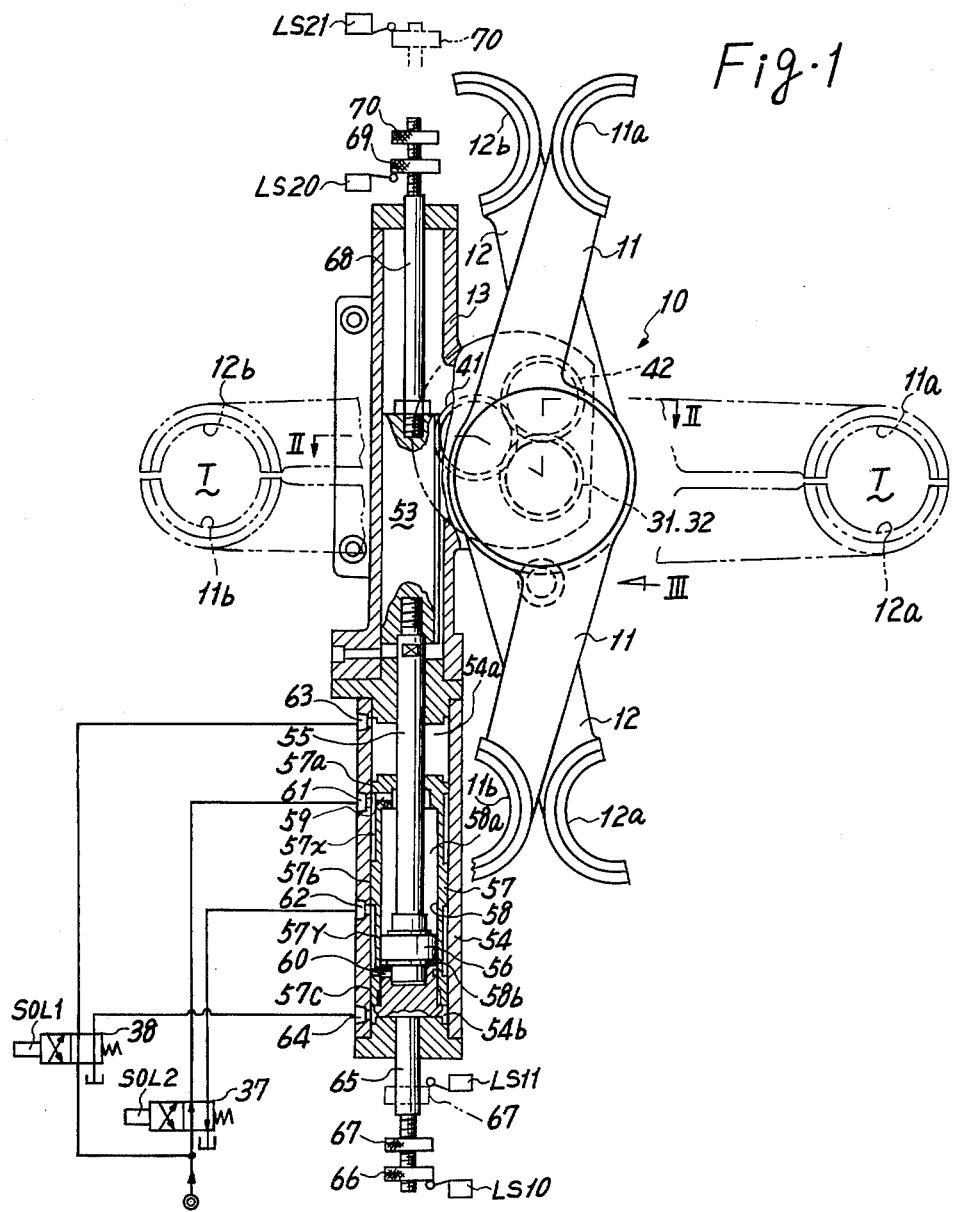
FIG. 1 is a front elevational view, partly in section, of a tool transfer apparatus according to the present invention.
Figure 2:
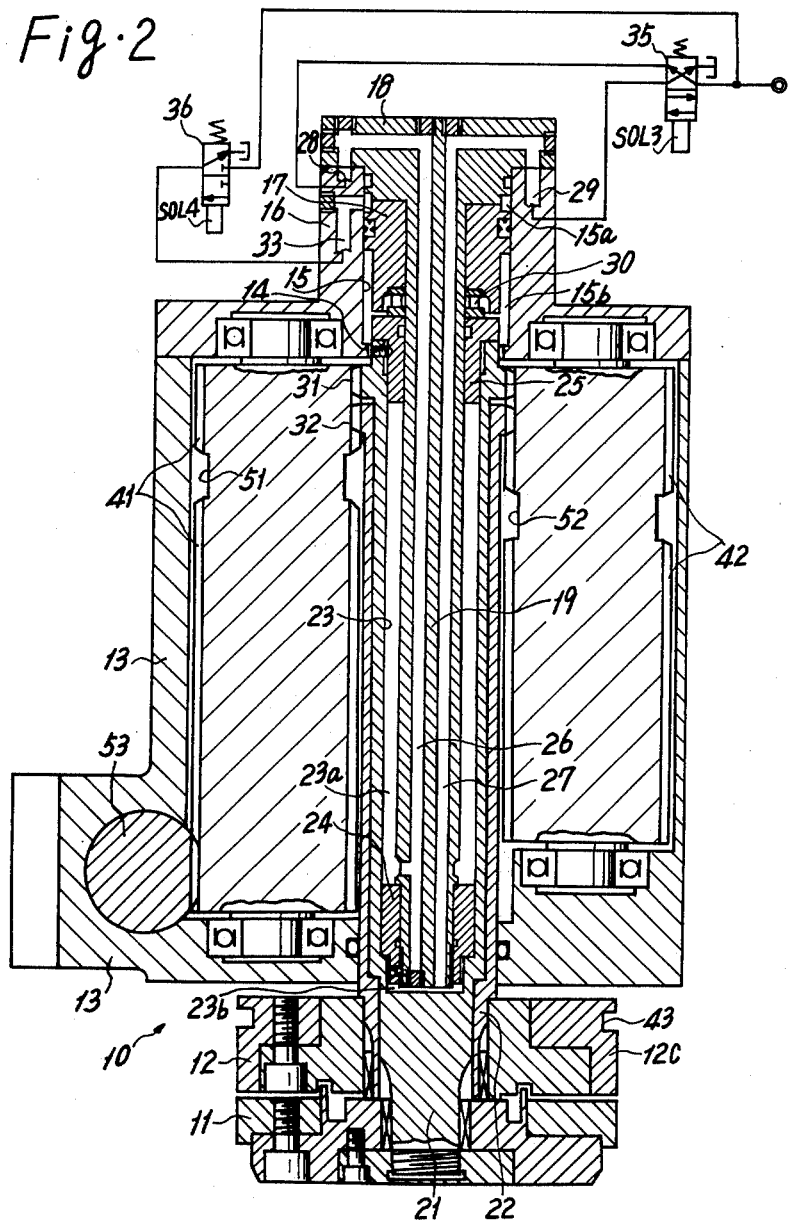
FIG. 2 is an enlarged sectional view taken generally along the lines II—II in FIG. 1.

Referring now to the drawings, wherein like reference numerals or characters refer to identical or corresponding parts throughout the several views, and more particularly to FIGS. 1 and 2, a tool transfer apparatus is generally indicated at 10. A frame 13 forming a base of the tool transfer apparatus 10 is secured to a component part of a machine tool, not shown. Coaxial first and second support shafts 21 and 22 are slidably and rotatably journalled in the frame 13 and provided at their front ends with first and second transfer arms 11 and 12, respectively. The first and second transfer arms 11 and 12 are provided at their opposite ends with grips 11a, 11b and 12a, 12b, respectively. The first and second support shafts 21 and 22 have at their other ends first and second driven gears 31 and 32, of the same dimension, being adjacent with each other. First and second elongated drive gears 41 and 42 are rotatably journalled in the frame 13 in parallel relation with the support shafts 21 and 22 and engageable with the first and second driven gears 31 and 32. The first and second drive gears 41 and 42 are engaged with each other to be rotated in opposite directions. The first and second drive gears 41 and 42 are formed at axially spaced positions with annular recessed grooves 51 and 52, respectively, the width of which is a little larger than that of the driven gears 31 and 32.

When the first driven gear 31 is aligned with the annular recessed groove 51, the second driven gear 32 is also aligned with the annular recessed groove 52, whereby the first driven gear 31 is engaged only with the second drive gear 42 and the second driven gear 32 is engaged only with the first drive gear 41. Accordingly, under these conditions, the first and second driven gears 31 and 32 are rotated in opposite directions. Furthermore, the entire length of the first drive gear 41 is larger than that of the second gear 42, in such a manner that the first ad second driven gears 31 and 32 are engaged only with the first drive gear 41, but not with the second drive gear 42 at their most advanced positions, to be rotated in the same direction.

Reference numeral 53 is a rack bar engaged with the first drive gear 41 and slidably received within the frame 13. This rack bar 53 is connected with a piston rod 55 of a cylinder 54 secured to the frame 13. A piston 56, secured to the one end of the piston rod 55, is slidably received within a cylindrical bore 58 of a sleeve piston 57, which is also slidably received within the cylinder 54. This sleeve piston 57 has at its outer periphery three axially spaced land portions 57a, 57b and 57c. Between the land portions 57a and 57b is formed an annular groove 57x on which is formed a passage 59 communicating with one cylinder chamber 58a. The annular groove 57x is also communicated with a port 61. Between the land portions 57b and 57c is formed an annular groove 57y on which is formed a passage 60 communicating with the other cylinder chamber 58b. The annular groove 57y is also communicated with a port 62. One cylinder chamber 54a is communicated with a port 63 and the other cylinder chamber 54b is communicated with a port 64.

A rod 65 projected from one end of the sleeve piston 57 extends through the end wall of the cylinder 54 and is provided with dogs 66 and 67, threadedly engaged therewith, for actuating limit switches LS10 and LS11. Another rod 68 projected from one end of the rack bar 53 extends through the end wall of the frame 13 and is provided with dogs 69 and 70, threadedly engaged therewith, for actuating limit switches LS20 and LS21.

Referring now more particularly to FIG. 2, which shows drive gears 41 and 42 in an outwardly shifted position for purpose of clarity an inner cylindrical bore 23 is formed at the center of the first support shaft 21, and an extension 16 is secured at the rear of the frame 13 and is also provided with an inner cylindrical bore 15. A piston 17 is received within the inner cylindrical bore 15 and a cap member 18 is secured to cover the opening of the inner bore 15. A piston 24 is received within the inner cylindrical bore 23 and is secured to one end of a stationary rod 19 which is projected from the cap member 18 and extends through the piston 17. A cap member 25 is secured to the end of the first support shaft 21 to close the opening of the inner cylindrical bore 23. A thrust bearing 30 is interposed between the cap member 25 and the piston 17. The stationary rod 19 is formed with passages 26 and 27 communicated with cylinder chambers 23a and 23b, respectively, which are divided by the piston 24. The passages 26 and 27 are also communicated with ports 28 and 29, respectively. Cylinder chambers 15a and 15b are divided by the piston 17. One cylinder chamber 15a is communicated with a port 33 and the other cylinder chamber 15b is communicated with a drain port, not shown.

Figure 3:
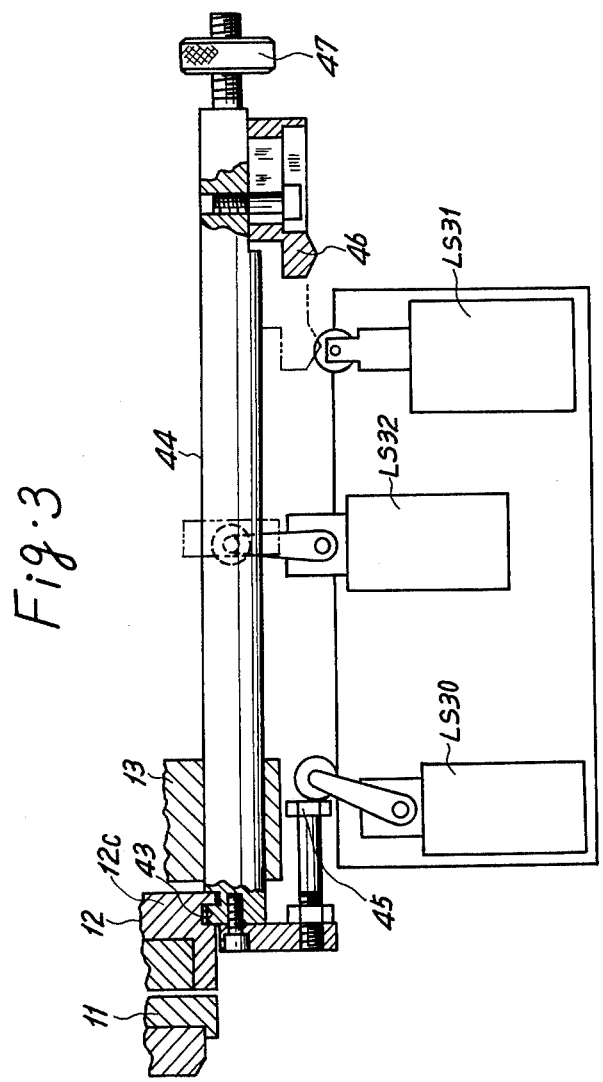
FIG. 3 is an enlarged view of the operation confirmation mechanism as viewed in the direction of the arrow in FIG. 1 and FIGS. 4 and 5 are enlarged sectional views similar to that of FIG. 2 showing separate modes of operation of the present invention.

The second transfer arm 12 is provided at the periphery of its boss portion 12c with an annular groove 43 into which a dog bar 44 is received in such a manner as to be restrained from axial movement relative thereto, as shown in FIG. 3. The dog bar 44 is slidably guided within the frame 13. The dog bar 44 is adjustably provided with dogs 45, 46 and 47. The dog 45 is provided to actuate a limit switch LS30 for confirmation of the most retracted end of the transfer arms 11 and 12. The dog 46 is provided to actuate a limit switch LS31 for confirmation of a tool grip position where the transfer arms 11 and 12 are rotated in opposite directions to grasp or release the tools. The dog 47 is provided to actuate a limit switch LS32 for confirmation of a most advanced position where the transfer arms 11 an 12 are rotated 180 degrees in the same direction.

A hydraulic circuit will now be described. The pots 28 and 29 are connected to a solenoid valve 35 with a solenoid SOL3. The port 33 is connected to a solenoid valve 36 with a solenoid SOL4. The ports 61 and 62 are connected to a solenoid valve 37 with a solenoid SOL2. The ports 63 and 64 are connected to a solenoid valve 38 with a solenoid SOL1.

Figure 4:
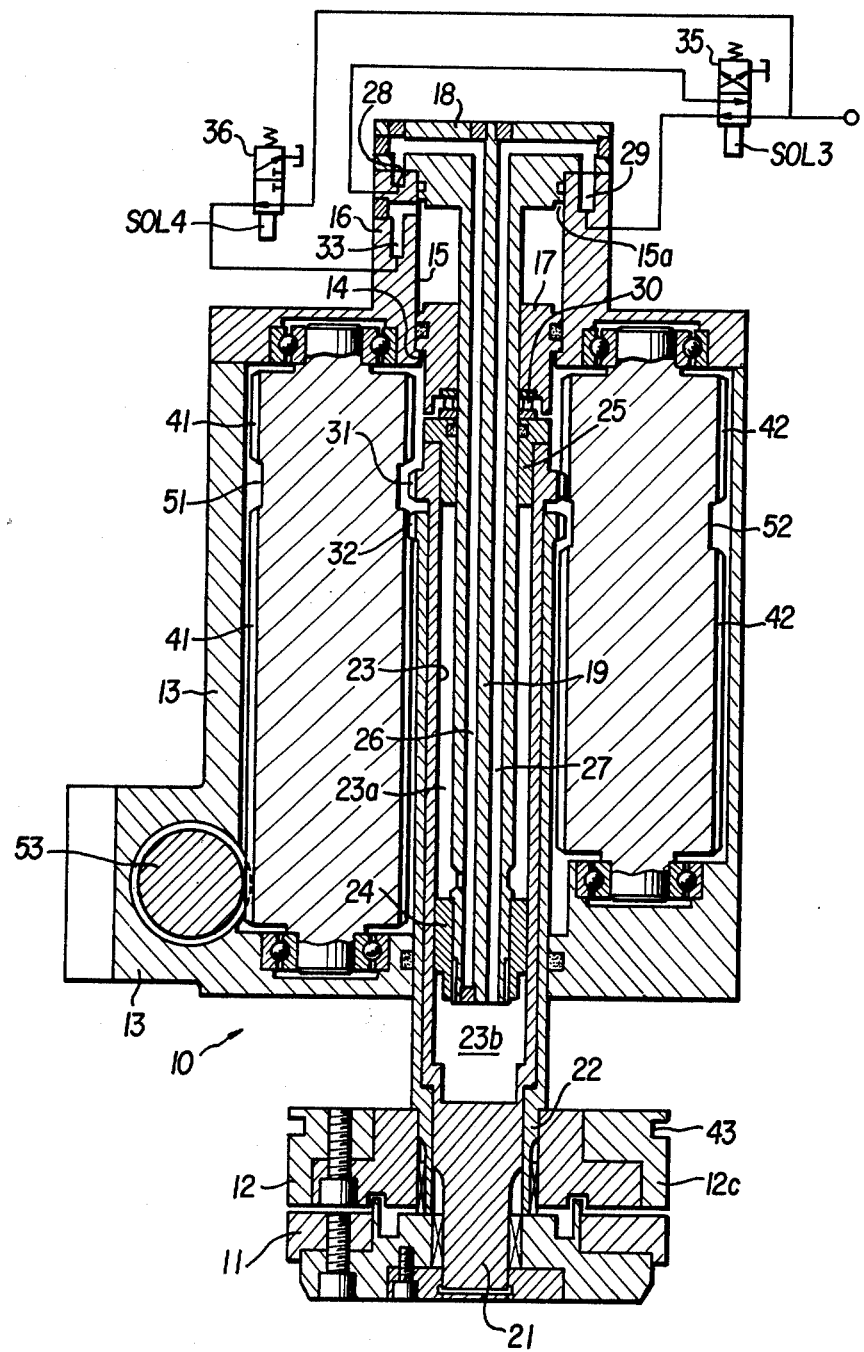

The operation of the tool transfer apparatus 10 as constructed above will now be described. In an original condition, all of the solenoids SOL1, SOL2, SOL3 and SOL4 of the solenoid valves 38, 37, 35 and 36, respectively, are deenergized as shown in the drawings. Accordingly, the grips 11a, 12a and 11b, 12b of the transfer arms 11 and 12 are spaced about 90 degrees from the tool grip positions for the tools T, as indicated by solid lines in FIG. 1. The transfer arms 11 and 12 are at the most retracted positions in the axial direction and the limit switches LS10, LS20 and LS30 are actuated. The first and second driven gears 31 and 32 are engaged with both of the first and second drive gears 41 and 42 to be restrained from rotation. When the solenoid SOL4 is energized under these conditions, the solenoid valve 36 is changed over to supply pressurized fluid into the cylinder chamber 15a from the port 33 to thereby move the piston 17 downward, as viewed in FIG. 4. Since the pressure receiving area of the piston 17 is larger than that of the cylinder chamber 23a, the piston 17 advances the first and second support shafts 21 and 22 through the thrust bearing 30. The piston 17 is engaged with the stop 14 formed on the extension 16 at its stroke end so that the first and second driven gears 31 and 32 are moved into alignment with the annular recessed grooves 51 and 52, respectively, as indicated in FIG. 4, and the limit switch LS31 is actuated by the dog 46.

When the limit switch LS31 is actuated, the solenoid SOL1 is energized to change over the solenoid valve 38 to thereby advance the sleeve piston 57. Accordingly, the rack bar 53 is advanced through the piston 56. With the advance movement of the rack bar 53, the first drive gear 41 is rotated clockwise, as viewed in FIG. 1, and the second drive gear 42 is rotated counterclockwise. Thus, the first driven gear 31 and the first transfer arm 11 are rotated clockwise and the second driven gear 32 and the second transfer arm 12 are rotated counterclockwise. When the sleeve piston 57 reaches its advanced end, the grips 11a, 12a and 11b, 12b of the transfer arms 11 and 12 are positioned at the tool grip positions to grasp the tools T, as shown in phantom lines in FIG. 1, and the limit switch LS11 is actuated by the dog 67 to energize the solenoid SOL3 to thereby change over the solenoid valve 35. Pressurized fluid is therefore admitted through the port 29 and the passage 27 into the cylinder chamber 23b to further advance the first support shaft 21. At this time, fluid is exhausted from the cylinder chamber 23a through the passage 26 and the port 28 to reservoir. The first and second driven gears 31 and 32 are thus moved axially forward together with the support shafts 21 and 22. The first and second driven gears 31 and 32 are engaged with both of the first and second drive gears 41 and 42 during the shifting movement thereof to be restrained from rotation, so that the tool grip condition is mechanically locked.

Figure 5:
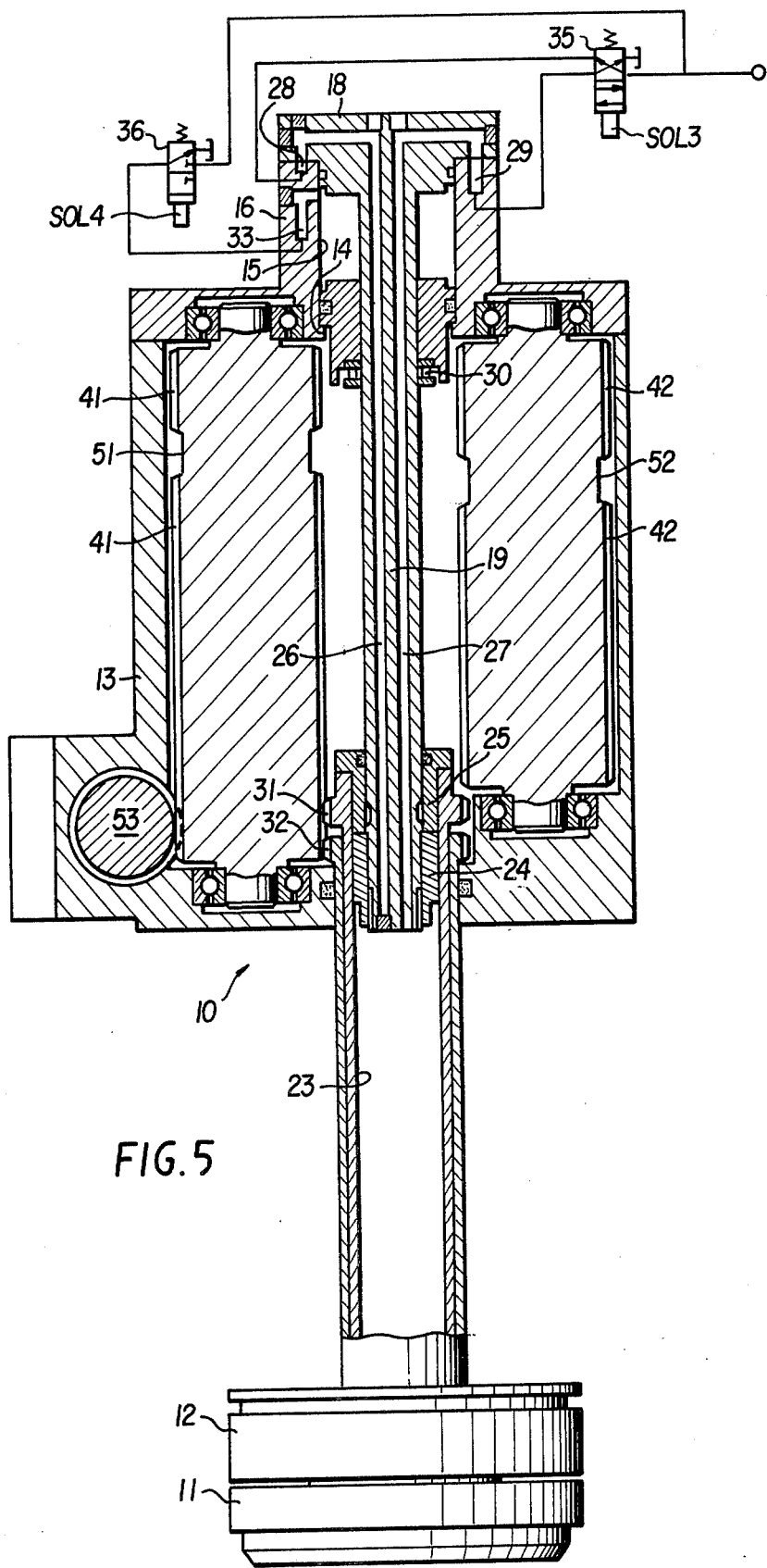

When the support shafts 21 and 22 are further advanced to their advanced ends, as shown in FIG. 5 the first and second driven gears 31 and 32 are engaged only with the first drive gear 41, but not with the second drive gear 42, and the limit switch LS32 is actuated by the dog 47 to energize the solenoid SOL2 to thereby change over the solenoid valve 37. Pressurized fluid is therefore supplied from the port 62 into the cylinder chamber 58b to cause the piston 56 to further advance the rack bar 53. The first drive gear 41 is rotated clockwise so that the first and second driven gears 31 and 32 and the first and second transfer arms 11 and 12 are all rotated counterclockwise. When the piston 56 reaches its stroke end, both the transfer arms 11 and 12 are rotated 180 degrees to replace the tools T held by the spindle of the machine tool and at the tool change position, and the limit switch LS21 is actuated by the dog 70 to deenergize the solenoid SOL3 to change over the solenoid valve 35.

Accordingly, pressurized fluid is admitted into the cylinder chamber 23a through the port 28 and the passage 26 to retract the support shafts 21 and 22 and the transfer arms 11 and 12. The tools T grasped by the grips are therefore inserted into the spindle and the tool socket at the tool change station. At the same time therewith, the limit switch LS31 is actuated to deenergize the solenoid SOL1 to change over the supply and exhaust condition for the cylinder chambers 54a and 54b. Therefore, the sleeve piston 57 is retracted to rotate the first drive gear 41 counterclockwise and the second drive gear 42 clockwise through the rack bar 53. Accordingly, the first transfer arm 11 is rotated counterclockwise and the second transfer arm 12 is rotated clockwise to release the tools T. Confirmation of this operation is made by the limit switch LS10 which causes the solenoid SOL4 to be deenergized to exhaust the fluid from the cylinder chamber 15a. Since pressurized fluid supplied into the cylinder chamber 23a acts on the end wall of the cap member 25, the piston 17 is retracted together with the support shafts 21 and 22. Accordingly, the first and second driven gears 31 and 32 are moved into their most retracted positions, as shown in FIG. 2, to be kept locked against rotation. The transfer arms 11 and 12 are thus retracted to their original positions to complete a first tool change operation. A second tool change operation differs from the first one only in that energization and deenergization of the solenoids SOL1 and SOL2 are reversed. The first and second transfer arms 11 and 12 are operated in a similar way to the previous operation, and returned to their original positions, as shown in the drawings when the second tool change operation is completed.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. A tool transfer apparatus in an automatic tool changer for exchanging tools between a machine tool spindle and a tool change station comprising:

a frame;

first and second support shafts coaxially mounted on said frame for rotational and axial movement thereon;

first and second transfer arms superposed with each other and respectively secured to said first and second support shafts, said transfer arms being formed at respective opposite ends with tool gripping portions for gripping said tools;

first and second driven gears formed on said first and second support shafts, respectively;

first and second elongated drive gears engaged with each other and engageable with said first and second diven gears;

means for axially shifting said first and second driven gears between first and second predetermined positions;

said first driven gear being engaged with said first drive gear and said second driven gear being engaged with said second drive gear when positioned at said first predetermined position, said first and second driven gears being engaged with one of said first and second drive gears when positioned at said second predetermined position, and said first and second driven gears being engaged with both of said first and second drive gears during the shifting movement;

a rack engaged with one of said first and second drive gears; and drive means connected to said rack for rotating said first and second driven gears at said first predetermined position in opposite directions to thereby simultaneously grip said tools by said gripping portions of said transfer arms and for rotating said first and second driven gears at said second predetermined position in the same direction to thereby replace the mutual position of said tools gripped by said transfer arms.

2. A tool transfer apparatus as claimed in claim 1, wherein said drive means comprises:

a sleeve piston slidably received in said frame to form a first fluid operated actuator;

a piston slidably received in said sleeve piston to form a second fluid operated actuator; and a piston rod connected at its one end to said piston and at its other end to said rack.

3. A tool transfer apparatus in an automatic tool changer for exchanging tools between a machine tool spindle and a tool change station comprising:

a frame;

first and second support shafts coaxially mounted on said frame for rotational and axial movement thereon;

first and second transfer arms superposed with each other and respectively secured to said first and second support shafts, said transfer arms being formed at respective opposite ends with tool gripping portions for gripping said tools;

first and second driven gears formed on said first and second support shafts, respectively;

first and second elongated drive gears in adjacent relation with each other and engageable with said first and second driven gears, and formed with first and second annular grooves, respectively, the width of said first and second annular grooves being larger than that of said first and second driven gears;

means for axially shifting said first and second driven gears between first, second and third predetermined positions;

said first driven gear being engaged with said first drive gear and said second driven gear being engaged with said second drive gear when positioned at said first predetermined position where said first and second driven gears are aligned with said second and first annular grooves, respectively, said first and second driven gears being engaged with one of said first and second drive gears when positioned at said second predetermined position, and said first and second driven gears being engaged with both of said first and second drive gears when positioned at said third position and during the shifting movement;

said first position being between said second and third positions;

a rack engaged with one of said first and second drive gears; and drive means connected to said rack for rotating said first and second driven gears at said first predetermined position in opposite directions to thereby simultaneously grip said tools by said gripping portions of said transfer arms and for rotating said first and second driven gears at said second predetermined position to thereby replace the mutual position of said tools gripped by said transfer arms.

* * * * *